US010294372B2

(12) United States Patent
Takahashi

(10) Patent No.: US 10,294,372 B2
(45) Date of Patent: May 21, 2019

(54) SURFACE-MODIFIED INORGANIC SUBSTANCE, METHOD FOR MANUFACTURING SURFACE-MODIFIED INORGANIC SUBSTANCE, METHOD FOR MODIFYING SURFACE OF INORGANIC SUBSTANCE WITH ORGANIC SUBSTANCE, HEAT DISSIPATION MATERIAL, THERMALLY CONDUCTIVE MATERIAL, AND LUBRICANT

(71) Applicant: FUJIFILM Corporation, Tokyo (JP)

(72) Inventor: Keita Takahashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 15/596,544

(22) Filed: May 16, 2017

(65) Prior Publication Data

US 2017/0247546 A1 Aug. 31, 2017

Related U.S. Application Data

(63) Continuation of application No. PCT/JP2015/083149, filed on Nov. 26, 2015.

(30) Foreign Application Priority Data

Nov. 27, 2014 (JP) ................................ 2014-239973

(51) Int. Cl.
| | | |
|---|---|---|
| C09C 1/36 | (2006.01) | |
| C01B 21/064 | (2006.01) | |
| C09C 1/40 | (2006.01) | |
| C09C 3/08 | (2006.01) | |
| C09K 5/14 | (2006.01) | |
| C09C 1/00 | (2006.01) | |
| C09C 1/04 | (2006.01) | |
| C10M 125/26 | (2006.01) | |
| C09C 1/28 | (2006.01) | |
| C10M 125/10 | (2006.01) | |
| C10M 139/00 | (2006.01) | |
| C01B 21/072 | (2006.01) | |
| C09C 3/06 | (2006.01) | |
| C10M 125/20 | (2006.01) | |

(52) U.S. Cl.
CPC .............. *C09C 1/36* (2013.01); *C01B 21/064* (2013.01); *C01B 21/072* (2013.01); *C09C 1/00* (2013.01); *C09C 1/04* (2013.01); *C09C 1/043* (2013.01); *C09C 1/28* (2013.01); *C09C 1/3607* (2013.01); *C09C 1/3661* (2013.01); *C09C 1/40* (2013.01); *C09C 1/407* (2013.01); *C09C 3/063* (2013.01); *C09C 3/08* (2013.01); *C09K 5/14* (2013.01); *C10M 125/10* (2013.01); *C10M 125/20* (2013.01); *C10M 125/26* (2013.01); *C10M 139/00* (2013.01); *C10M 2201/061* (2013.01); *C10M 2201/062* (2013.01); *C10M 2201/087* (2013.01); *C10M 2201/10* (2013.01); *C10M 2227/061* (2013.01); *C10N 2210/02* (2013.01); *C10N 2210/03* (2013.01); *C10N 2210/04* (2013.01); *C10N 2220/08* (2013.01); *C10N 2250/08* (2013.01); *C10N 2260/14* (2013.01)

(58) Field of Classification Search
None
See application file for complete search history.

(56) References Cited

U.S. PATENT DOCUMENTS

| | | | | |
|---|---|---|---|---|
| 7,244,498 | B2 * | 7/2007 | Cook | ........................ B01J 2/30 427/214 |
| 2008/0311300 | A1 | 12/2008 | Burdinski et al. | |
| 2010/0092663 | A1 | 4/2010 | Ajiri | |
| 2014/0302325 | A1 | 10/2014 | Shimada et al. | |

FOREIGN PATENT DOCUMENTS

| | | |
|---|---|---|
| JP | 2001-192500 A | 7/2001 |
| JP | 2005-194148 A | 7/2005 |
| JP | 2007-002089 A | 1/2007 |
| JP | 2009-502529 A | 1/2009 |
| JP | 2010-107496 A | 5/2010 |
| JP | 4694929 B2 | 6/2011 |
| JP | 2012-197195 A | 10/2012 |
| JP | 5599012 B1 | 10/2014 |
| WO | 2013/057945 A1 | 4/2013 |
| WO | 2013/133281 A1 | 9/2013 |

OTHER PUBLICATIONS

International Preliminary Report on Patentability dated Jun. 1, 2017, from the International Bureau in counterpart International Application No. PCT/JP2015/083149.

(Continued)

*Primary Examiner* — Clinton A Brooks
*Assistant Examiner* — Kofi Adzamli
(74) *Attorney, Agent, or Firm* — Sughrue Mion, PLLC

(57) ABSTRACT

The present invention provides a novel surface-modified inorganic substance obtained by modifying the surface of an inorganic nitride or an inorganic oxide with a boronic acid compound, and a heat dissipation material, a thermally conductive material, and a lubricant which use the surface-modified inorganic substance. The present invention also provides a method for manufacturing the surface-modified inorganic substance, and provides, as a novel method for modifying the surface of an inorganic substance selected from an inorganic oxide and an inorganic nitride with an organic substance, a method for modifying the surface of an inorganic nitride or an inorganic oxide with an organic substance that includes making a contact between the inorganic nitride or the inorganic oxide with a boronic acid compound.

11 Claims, 2 Drawing Sheets

(56) References Cited

OTHER PUBLICATIONS

Tim A. Schuller et al., "Field-effect saccharide sensing using AlGaN/GaN heterostructures and boronic acid based chemical receptors", Sensors and Actuators B: Chemical, Dec. 15, 2011, pp. 1078-1081, vol. 160, No. 1.
Dandan Hao et al., "Fabrication of a COF-5 membrane on a functionalized $\alpha$-$Al_2O_3$ ceramic support using a microwave irradiation method", Chemical Communications, Feb. 11, 2014, pp. 1462-1464, vol. 50, No. 12.
Sitong Zhang et al., "Boronic acid functionalized magnetic nanoparticles via thiol-ene click chemistry for selective enrichment of glycoproteins", New Journal of Chemistry, Sep. 2014, pp. 4212-4218, vol. 38, No. 9.
International Search Report for PCT/JP2015/083149, dated Mar. 1, 2016.

\* cited by examiner

SURFACE-MODIFIED INORGANIC SUBSTANCE, METHOD FOR MANUFACTURING SURFACE-MODIFIED INORGANIC SUBSTANCE, METHOD FOR MODIFYING SURFACE OF INORGANIC SUBSTANCE WITH ORGANIC SUBSTANCE, HEAT DISSIPATION MATERIAL, THERMALLY CONDUCTIVE MATERIAL, AND LUBRICANT

CROSS-REFERENCE TO RELATED APPLICATIONS

This application is a continuation of PCT International Application No. PCT/JP2015/083149 filed on Nov. 26, 2015, which claims priority under 35 U.S.C § 119 (a) to Japanese Patent Application No. 2014-239973 filed on Nov. 27, 2014, the entire content of which is incorporated herein by reference.

BACKGROUND OF THE INVENTION

1. Field of the Invention

The present invention relates to a surface-modified inorganic substance and a method for manufacturing a surface-modified inorganic substance. Furthermore, the present invention relates to a method for modifying the surface of an inorganic substance with an organic substance. The present invention also relates to a heat dissipation material, a thermally conductive material, and a lubricant.

2. Description of the Related Art

The inorganic substance such as an inorganic oxide or an inorganic nitride can be used in a wide range of applications as a pigment, a catalyst, an electrode material, a semiconductor material, a heat dissipation material, a thermally conductive material, a lubricant, and the like. In addition, the inorganic substance is used in various fields in the form of granules or a substrate. In a case where the surface of the inorganic substance is modified with an organic substance, the dispersibility and the affinity of the inorganic substance with respect to organic substances are improved, and hence the inorganic substance can be used in a wider range of applications. Therefore, in the related art, the surface-modified inorganic substances modified with various organic substances have been suggested (for example, JP2009-502529A).

Regarding the compounds used for modifying the surface of an inorganic oxide, the surface modification accomplished when an acid such as a carboxylic acid including a long-chain alkyl fatty acid, an organic phosphonic acid, or an organic phosphoric acid ester forms a chemical bond through an acid-base reaction or the surface modification accomplished by a chemical bond formed through a silane coupling reaction between the acid and an organic silane molecule, are well known.

As a method for modifying the surface of an inorganic nitride, JP2001-192500A reports a method in which boron nitride is mixed with 1,4-phenylene diisocyanate and then heated under reflux in a solvent.

SUMMARY OF THE INVENTION

Objects of the present invention are to provide a novel surface-modified inorganic substance as a surface-modified inorganic substance obtained by modifying the surface of an inorganic substance selected from an inorganic oxide and an inorganic nitride with an organic substance, and provide a heat dissipation material, a thermally conductive material, and a lubricant which use the surface-modified inorganic substance. Other objects of the present invention are to provide a method for manufacturing the surface-modified inorganic substance and provide a novel method as a method for modifying the surface of an inorganic substance selected from an inorganic oxide and an inorganic nitride with an organic substance.

In order to achieve the above objects, the inventors of the present invention attempted to modify the surface of an inorganic substance with various compounds. As a result, they obtained knowledge that, in a case where the boronic acid compound described in JP4694929B or the like is used, the surface of an inorganic substance can be more easily modified than in a case where the method disclosed in JP2001-192500A is used. Although a boronic acid is described in JP2009-502529A, the document does not disclose a case where the boronic acid has actually been used for surface modification. The inventors of the present invention further repeated investigation based on the aforementioned knowledge and accomplished the present invention.

That is, the present invention provides the following [1] to [20].

[1] A surface-modified inorganic substance obtained by modification of the surface of an inorganic nitride or an inorganic oxide with a boronic acid compound.

[2] A surface-modified inorganic substance obtained by modification of the surface of an inorganic nitride with a boronic acid compound.

[3] The surface-modified inorganic substance described in [2], in which the inorganic nitride contains boron, aluminum, or silicon.

[4] The surface-modified inorganic substance described in [2], in which the inorganic nitride is boron nitride.

[5] The surface-modified inorganic substance described in [2], in which the inorganic nitride is aluminum nitride.

[6] A surface-modified inorganic substance obtained by modification of the surface of an inorganic oxide with a boronic acid compound.

[7] The surface-modified inorganic substance described in [6], in which the inorganic oxide is titanium oxide, aluminum oxide, or zinc oxide.

[8] The surface-modified inorganic substance described in any one of [1] to [7], in which the modification of the surface is modification accomplished when the boronic acid compound forms a covalent bond with the surface of the inorganic nitride or the inorganic oxide.

[9] The surface-modified inorganic substance described in any one of [1] to [8], in which the boronic acid compound is represented by the following Formula I.

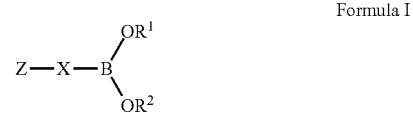

Formula I

In the formula, Z represents a polymerizable group, a hydrogen atom, a halogen atom, a quaternary ammonium group or a salt thereof, or a quaternary pyridinium group which may have a substituent or a salt thereof, X represents a divalent linking group containing at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, and $R^1$ and $R^2$ may be linked through an alkylene linking group, an aryl linking group, or a linking group as a combination of an alkylene linking group and an aryl linking group.

[10] The surface-modified inorganic substance described in any one of [1] to [8], in which the boronic acid compound is represented by the following Formula II.

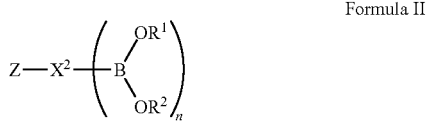

Formula II

In the formula, Z represents a polymerizable group, a hydrogen atom, a halogen atom, a quaternary ammonium group or a salt thereof, or a quaternary pyridinium group which may have a substituent or a salt thereof, $X^2$ represents an (n+1)-valent linking group containing at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, $R^1$ and $R^2$ may be linked through an alkylene linking group, an aryl linking group, or a linking group as a combination of an alkylene linking group and an aryl linking group, and n represents an integer equal to or greater than 2.

[11] The surface-modified inorganic substance described in [9] or [10], in which in Formula I or Formula II, Z represents a (meth)acrylate group, an oxiranyl group, or a hydrogen atom.

[12] A heat dissipation material comprising the surface-modified inorganic substance described in any one of [1] to [11].

[13] A thermally conductive material comprising the surface-modified inorganic substance described in any one of [1] to [11].

[14] A lubricant comprising the surface-modified inorganic substance described in any one of [1] to [11].

[15] A method for manufacturing the surface-modified inorganic substance described in any one of [1] to [11], comprising making a contact between the inorganic nitride or the inorganic oxide and the boronic acid compound.

[16] The method for manufacturing the surface-modified inorganic substance described in [15], in which the contact is established by stirring a solution containing the inorganic nitride or the inorganic oxide and the boronic acid compound.

[17] The method for manufacturing the surface-modified inorganic substance described in [16], in which a solvent of the solution is ethyl acetate, methyl ethyl ketone, or dichloromethane.

[18] A method for modifying the surface of an inorganic nitride or an inorganic oxide with an organic substance, comprising making a contact between an inorganic nitride or an inorganic oxide and a boronic acid compound.

[19] The method described in [18], in which the contact is established by stirring a solution containing the inorganic nitride or the inorganic oxide and the boronic acid compound.

[20] The method described in [19], in which a solvent of the solution is ethyl acetate, methyl ethyl ketone, or dichloromethane.

The present invention provides a novel surface-modified inorganic substance as a surface-modified inorganic substance obtained by modifying the surface of an inorganic substance selected from an inorganic oxide and an inorganic nitride with an organic substance, a heat dissipation material, a thermally conductive material, and a lubricant which use the surface-modified inorganic substance, and a method for manufacturing the surface-modified inorganic substance. The present invention also provides a novel method as a method for modifying the surface of an inorganic substance selected from an inorganic oxide and an inorganic nitride with an organic substance. The surface-modified inorganic substance of the present invention can be obtained by an easy manufacturing method. Furthermore, by the method of the present invention, it is possible to easily modify the surface of an inorganic nitride whose surface is not easily modified by a silane coupling agent widely used in the related art.

DESCRIPTION OF THE PREFERRED EMBODIMENTS

Figure 1:
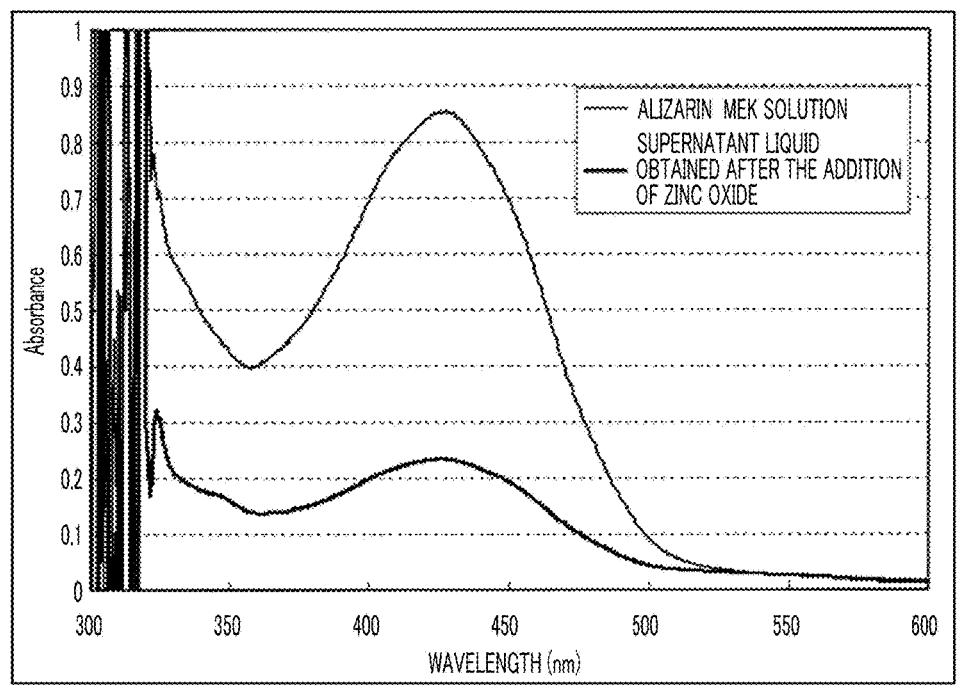
FIG. 1 is a view showing visible absorption spectra of an alizarin solution and a filtrate of the alizarin solution obtained after the addition of zinc oxide.

Hereinafter, the present invention will be specifically described.

In the present specification, "to" means that the numerical values listed before and after "to" are of a lower limit and an upper limit, respectively. In the present specification, the description of "(meth)acrylate" means "either or both of acrylate and methacrylate".

In the present specification, "surface-modified" means a state where an organic substance is adsorbed onto at least a portion of the surface. The way the organic substance is adsorbed is not particularly limited, and the organic substance may be in a bonded state. That is, "surface-modified" includes a state where an organic group obtained by the dissociation of a portion of an organic substance forms a bond with the surface of an inorganic substance. The bond may be any one of a covalent bond, a coordinate bond, an ionic bond, a hydrogen bond, a van der Waals bond, and a metallic bond, but is preferably a covalent bond. In the "surface-modified" state, a monolayer may be formed on at least a portion of the surface. The monolayer is a monolayer film formed by the chemical adsorption of organic molecules, and is known as Self-Assembled Monolayer (SAM). The organic substance is a so-called organic compound, and means a carbon atom-containing compound excluding carbon monoxide, carbon dioxide, carbonate, and the like that are customarily classified as an inorganic compound. In the present specification, the "surface-modified" state may be established on only a portion of the surface or on the entirety of the surface.

In the present specification, the "surface-modified inorganic substance" means an inorganic substance whose surface is modified, that is, a substance in which the surface of an inorganic substance has an organic substance adsorbed onto it.

<Inorganic Substance>

As the inorganic substance in the surface-modified inorganic substance of the present invention, an inorganic oxide or an inorganic nitride is used. The inorganic substance may be an inorganic oxynitride. The shape of the inorganic substance is not particularly limited, and may be granular, film-like, or plate-like.

The granules may have a rice grain shape, a spherical shape, a cubical shape, a spindle shape, a scale shape, an aggregated shape, or an amorphous shape.

The inorganic oxide is not particularly limited, and examples thereof include zirconium oxide ($ZrO_2$), titanium oxide ($TiO_2$), silicon oxide ($SiO_2$), aluminum oxide ($Al_2O_3$), iron oxide ($Fe_2O_3$, FeO, or $Fe_3O_4$), copper oxide (CuO or $Cu_2O$), zinc oxide (ZnO), yttrium oxide ($Y_2O_3$), niobium oxide ($Nb_2O_5$), molybdenum oxide ($MoO_3$), indium oxide ($In_2O_3$ or $In_2O$), tin oxide ($SnO_2$), tantalum oxide ($Ta_2O_5$), tungsten oxide ($WO_3$ or $W_2O_5$), lead oxide (PbO or $PbO_2$), bismuth oxide ($Bi_2O_3$), cerium oxide ($CeO_2$ or $Ce_2O_3$), antimony oxide ($Sb_2O_3$ or $Sb_2O_5$), germanium oxide ($GeO_2$ or GeO), lanthanum oxide ($La_2O_3$), ruthenium oxide ($RuO_2$), and the like.

The above inorganic oxides may be used singly, or plural kinds thereof may be used in combination.

The inorganic oxide is preferably titanium oxide, aluminum oxide, or zinc oxide.

The inorganic oxide in the surface-modified inorganic substance of the present invention may be an oxide that is generated when a metal prepared as a non-oxide is oxidized due to the environment or the like.

The inorganic nitride is not particularly limited, and examples thereof include boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), zirconium nitride (ZrN), and the like.

The above inorganic nitrides may be used singly, or plural kinds thereof may be used in combination.

The inorganic nitride in the surface-modified inorganic substance of the present invention preferably contains aluminum, boron, or silicon, and is preferably aluminum nitride, boron nitride, or silicon nitride.

<Boronic Acid Compound>

The surface modification for the surface-modified inorganic substance of the present invention is performed using a boronic acid compound. The boronic acid compound has a structure in which one or more hydroxyl groups of boronic acid are substituted with an organic group such as a hydrocarbon group. By being adsorbed onto an inorganic substance generally through the boron portion, the boronic acid compound modifies the surface of the inorganic substance. The boronic acid compound may, for example, be a compound represented by the following Formula I.

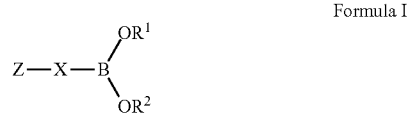

Formula I

In Formula I, Z represents a polymerizable group, a hydrogen atom, a halogen atom, a quaternary ammonium group or a salt thereof, or a quaternary pyridinium group or a salt thereof. The quaternary pyridinium group may have a substituent.

X represents a divalent linking group. X contains at least one linking group A selected from the group consisting of a divalent aliphatic hydrocarbon group which may have a substituent, an arylene group which may have a substituent, and a heteroarylene group which may have a substituent. X may contain one or more linking groups B selected from the group consisting of —O—, —CO—, —NH—, —CO—NH—, —COO—, and —O—COO—. That is, X is the linking group A, a linking group constituted with a combination of two or more linking groups A, or a linking group constituted with a combination of one or more linking groups A and one or more linking groups B.

$R^1$ and $R^2$ each independently represent a hydrogen atom, an aliphatic hydrocarbon group which may have a substituent, an aryl group which may have a substituent, or a heteroaryl group which may have a substituent.

$R^1$ and $R^2$ may be linked through an alkylene linking group, an arylene linking group, or a linking group as a combination of an alkylene linking group and an arylene linking group.

The divalent aliphatic hydrocarbon group which may have a substituent include an alkylene group which may have a substituent and an alkenylene group which may have a substituent.

The aliphatic hydrocarbon group which may have a substituent that is represented by each of R and $R^2$ include an alkyl group which may have a substituent, an alkenyl group which may have a substituent, and an alkynyl group which may have a substituent.

In the present specification, the alkyl group may be linear, branched, or cyclic. The number of carbon atoms in the alkyl group is preferably 1 to 30, and more preferably 2 to 10. Specific examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methyhexyl group, a cyclopentyl group, a cyclohexyl group, a 1-adamantyl group, a 2-norbornyl group, and the like. The above description relating to the alkyl group is also applied to other groups such as an alkyl group-containing alkoxy group. The alkylene group is a group obtained by removing a certain hydrogen atom from the alkyl group, and examples of the alkylene group include the groups obtained by removing a certain hydrogen atom from each of the aforementioned examples of the alkyl group.

In the present specification, the alkenyl group may be linear, branched, or cyclic. The number of carbon atoms in the alkenyl group is preferably 2 to 30, and more preferably 2 to 10. Specific examples of the alkenyl group include a vinyl group, a 1-propenyl group, a 1-butenyl group, a 1-methyl-1-propenyl group, a 1-cyclopentenyl group, a 1-cyclohexenyl group, and the like. The above description relating to the alkenyl group is also applied to other groups containing the alkenyl group. The alkenylene group is a group obtained by removing a certain hydrogen atom from the alkenyl group, and examples of the alkenylene group include the groups obtained by removing a certain hydrogen atom from each of the aforementioned examples of the alkenyl group.

The number of carbon atoms in the alkynyl group is preferably 2 to 30, and more preferably 2 to 10. Specific examples of the alkynyl group include an ethynyl group, a 1-propynyl group, a 1-butynyl group, a 1-octynyl group, and the like.

The aryl group may be a monocyclic group or a ring-fused group containing two or more rings. The number of carbon atoms in the aryl group is preferably 5 to 18, and more preferably 5 to 10. Specific examples of the aryl group include a phenyl group, a naphthyl group, an anthryl group, a phenanthryl group, an indenyl group, an acenaphthenyl group, a fluorenyl group, a pyrenyl group, and the like. The arylene group is a group obtained by removing a certain hydrogen atom from the aryl group, and examples of the arylene group include the groups obtained by removing a certain hydrogen atom from each of the aforementioned examples of the aryl group.

Examples of the heteroaryl group include heteroaryl groups obtained by removing one hydrogen atom on a heterocyclic aromatic ring containing one or more hetero atoms selected from the group consisting of a nitrogen atom, an oxygen atom, and a sulfur atom. Specific examples of the heterocyclic aromatic ring containing one or more hetero atoms selected from the group consisting of a nitrogen atom, an oxygen atom, and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranyl, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, and the like. The heteroarylene group is a group obtained by removing a certain hydrogen atom from the heteroaryl group, and examples of the heteroarylene group include the groups obtained by removing a certain hydrogen atom from each of the aforementioned examples of the heteroaryl group.

In the present specification, when the description of "may have a substituent" appears, the type of substituent, the position of substituent, and the number of substituents are not particularly limited. The number of substituents may, for example, be 1, 2, 3, or greater. Examples of the substituent include a group of monovalent nonmetallic atoms excluding a hydrogen atom, and the substituent can be selected from the following substituent group Y for example.

Substituent group Y: halogen atom (—F, —Br, —Cl, or —I), a hydroxyl group, an alkoxy group, an aryloxy group, a mercapto group, an alkylthio group, an arylthio group, an alkyldithio group, an aryldithio group, an amino group, a N-alkylamino group, a N,N-dialkylamino group, a N-arylamino group, a N,N-diarylamino group, a N-alkyl-N-arylamino group, an acyloxy group, a carbamoyloxy group, a N-alkylcarbamoyloxy group, a N-arylcarbamoyloxy group, a N,N-dialkylcarbamoyloxy group, a N,N-diarylcarbamoyloxy group, a N-alkyl-N-arylcarbamoyloxy group, an alkylsulfoxy group, an arylsulfoxy group, an acylthio group, an acylamino group, a N-alkylacylamino group, a N-arylacylamino group, a ureide group, a N'-alkylarylureide group, a N',N'-dialkylureide group, a N'-arylureide group, a N',N'-diarylureide group, a N'-alkyl-N-arylureide group, a N-alkylureide group, a N-arylureide group, a N'-alkyl-N-alkylureide group, a N'-alkyl-N-arylureide group, a N',N'-dialkyl-N-alkylureide group, a N',N'-dialkyl-N-arylureide group, a N'-aryl-N-alkylureide group, a N'-aryl-N-arylureide group, a N',N'-diaryl-N-alkylureide group, a N',N'-diaryl-N-arylureide group, a N'-alkyl-N'-aryl-N-alkylureide group, a N'-alkyl-N'-aryl-N-arylureide group, an alkoxycarbonylamino group, an aryloxycarbonylamino group, a N-alkyl-N-alkoxycarbonylamino group, a N-alkyl-N-aryloxycarbonylamino group, a N-aryl-N-alkoxycarbonylamino group, a N-aryl-N-aryloxycarbonylamino group, a formyl group, an acyl group, a carboxyl group and a conjugated base group thereof, an alkoxycarbonyl group, an aryloxycarbonyl group, a carbamoyl group, a N-alkylcarbamoyl group, a N,N-dialkylcarbamoyl group, a N-arylcarbamoyl group, a N,N-diarylcarbamoyl group, a N-alkyl-N-arylcarbamoyl group, an alkylsufinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, a N-alkylsulfinamoyl group, a N,N-dialkylsulfinamoyl group, a N-arylsulfinamoyl group, a N,N-diarylsulfinamoyl group, a N-alkyl-N-arylsulfinamoyl group, a sulfamoyl group, a N-alkylsulfamoyl group, a N,N-dialkylsulfamoyl group, a N-arylsulfamoyl group, a N,N-diarylsulfamoyl group, a N-alkyl-N-arylsulfamoyl group, a N-acylsulfamoyl group and a conjugated base group thereof, a N-alkylsulfonylsulfamoyl group (—SO$_2$NHSO$_2$(alkyl)) and a conjugated base group thereof, a N-arylsulfonylsulfamoyl group (—SO$_2$NHSO$_2$(aryl)) and a conjugated base group thereof, a N-alkylsulfonylcarbamoyl group (—CONHSO$_2$(alkyl)) and a conjugated base group thereof, a N-arylsulfonylcarbamoyl group (—CONHSO$_2$(aryl)) and a conjugated base group thereof, an alkoxysilyl group (—Si(Oalkyl)$_3$), an aryloxysilyl group (—Si(Oaryl)$_3$), a hydroxysilyl group (—Si(OH)$_3$) and a conjugated base group thereof, a phosphono group (—PO$_3$H$_2$) and a conjugated base group thereof, a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugated base group thereof, a monoarylphosphono group (—PO$_3$H(aryl)) and a conjugated base group thereof, a phosphonooxy group (—OPO$_3$H$_2$) and a conjugated base group thereof, a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugated base group thereof, a monoarylphosphonooxy group (—OPO$_3$H(aryl)) and a conjugated base group thereof, a cyano group, a nitro group, an aryl group, an alkenyl group, and an alkynyl group.

These substituents may form a ring with each other if possible or may form a ring by being bonded to the group substituted with the substituents.

Examples of the polymerizable group include a (meth) acrylate group, a styryl group, a vinyl ketone group, a butadiene group, a vinyl ether group, an oxiranyl group, an aziridinyl group, an oxetanyl group, and the like. Among these, a (meth)acrylate group, a styryl group, an oxiranyl group, or an oxetane group is more preferable, and a (meth)acrylate group or an oxiranyl group is even more preferable.

R¹ and R² in Formula I are preferably a hydrogen atom.

X in Formula I is preferably a linking group containing a phenylene group which may have at least one substituent, and more preferably a linking group having a partial structure to which a phenylene group having two substituents is linked through —COO—. Furthermore, X is preferably a linking group containing an unsubstituted phenylene group. It is particularly preferable that the unsubstituted phenylene group is directly bonded to a boron atom of the boronic acid.

Z in Formula I is preferably a (meth)acrylate group, an oxiranyl group, or a hydrogen atom.

The boronic acid compound preferably has a chain-like structure, because then a monolayer is easily formed.

Preferred examples of the boronic acid compound represented by Formula I will be shown below, but the present invention is not limited thereto.

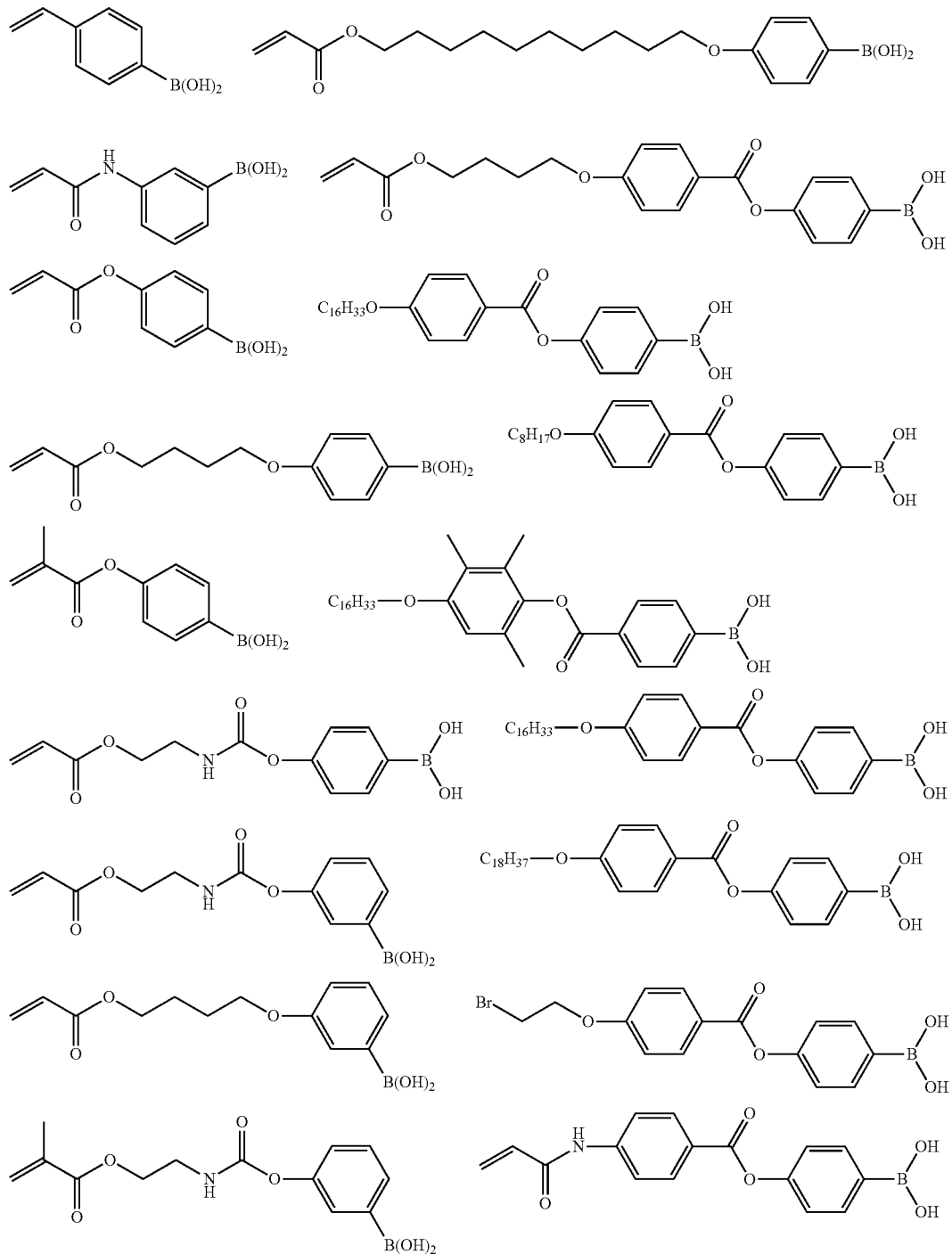

11
12
-continued
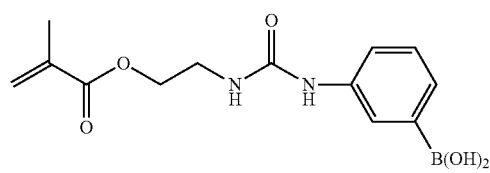
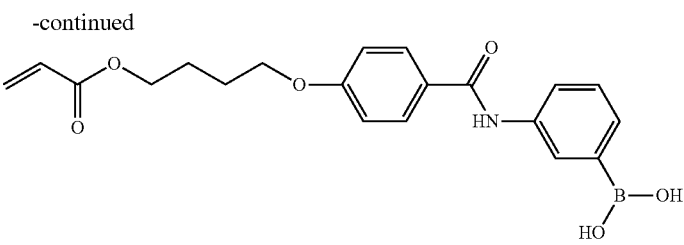
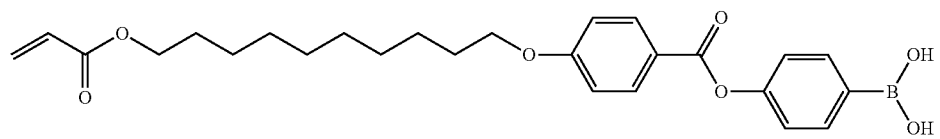
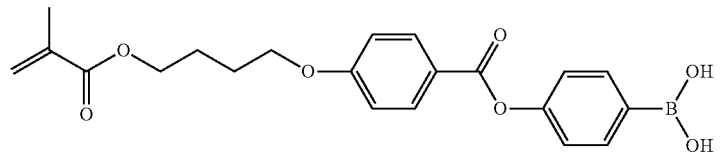
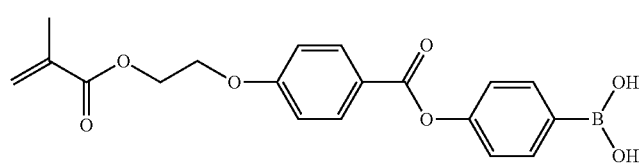
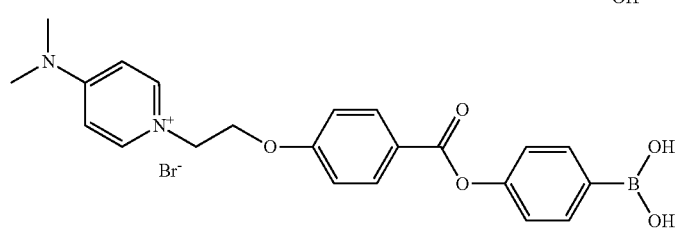
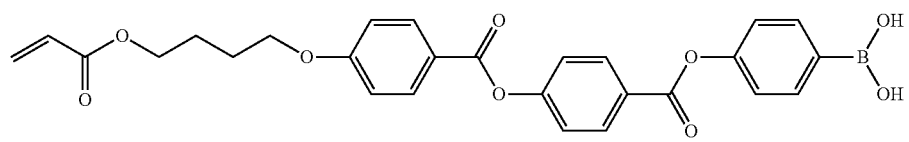
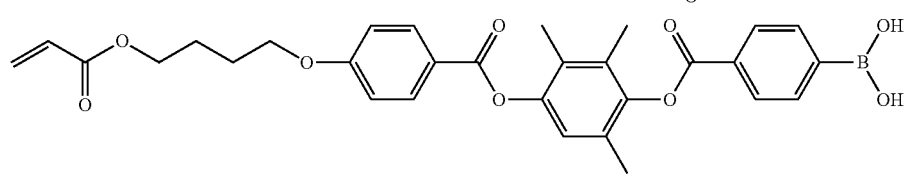
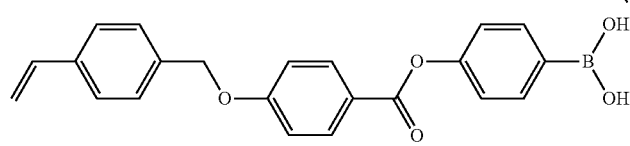
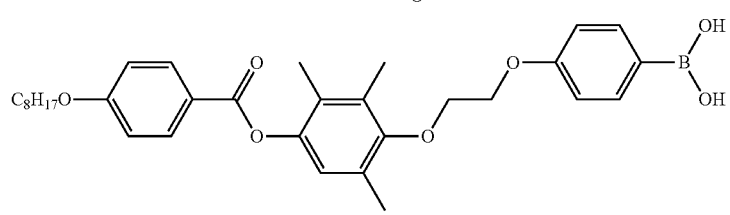
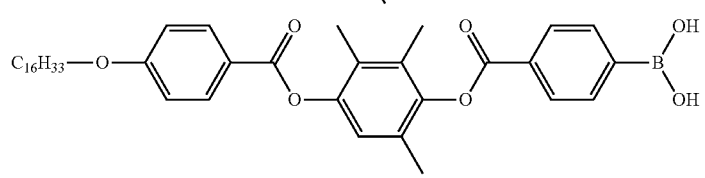

-continued
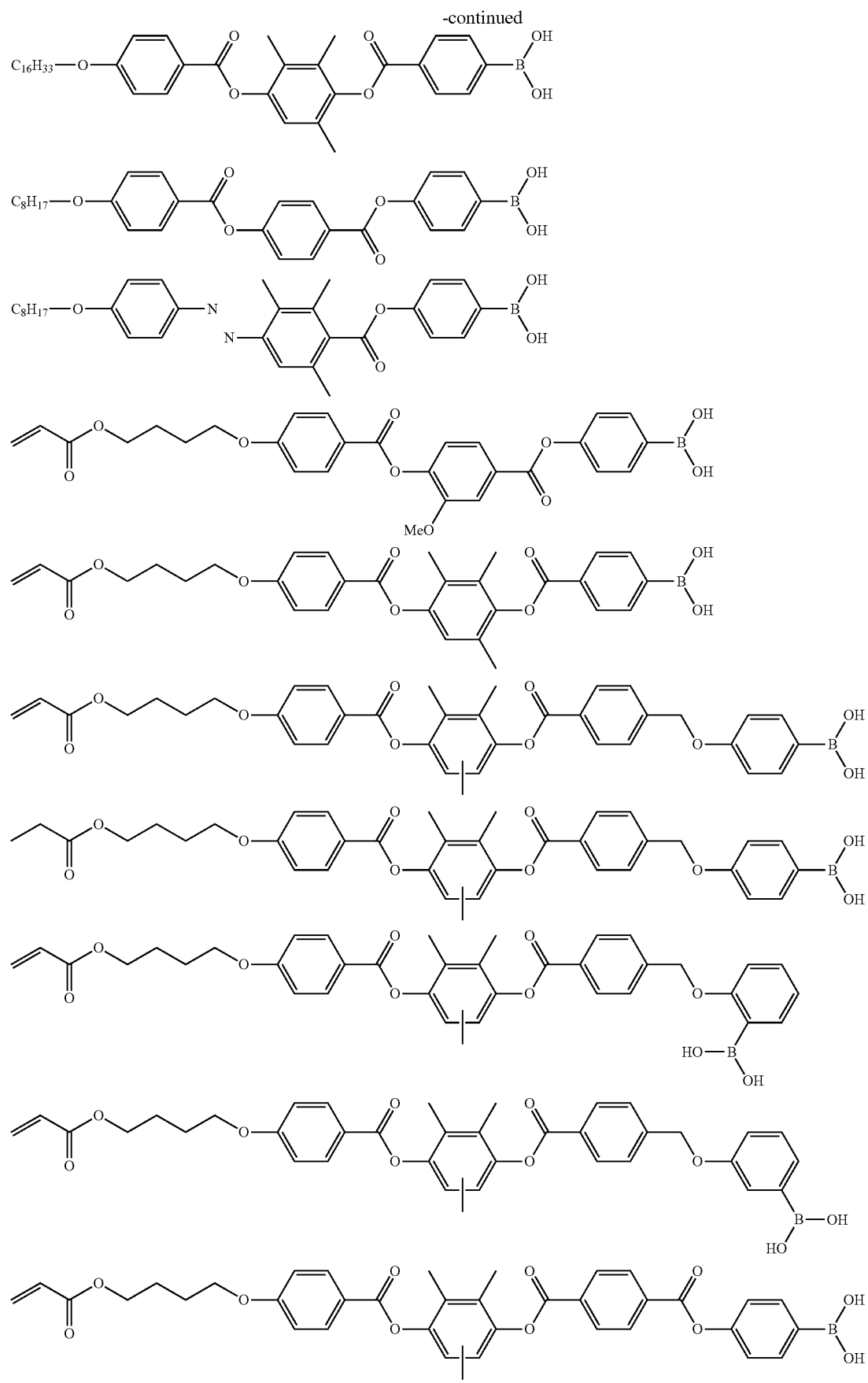

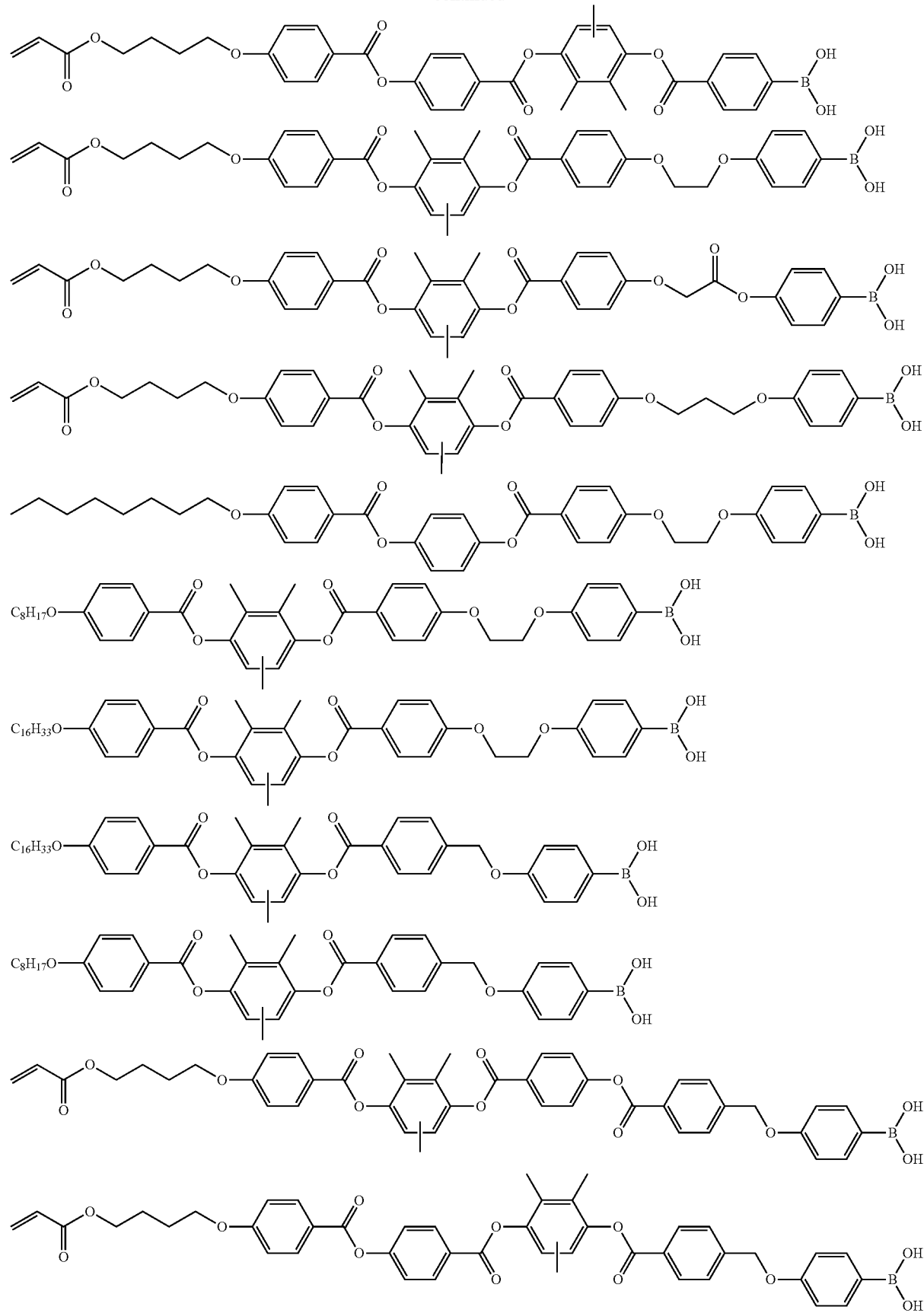

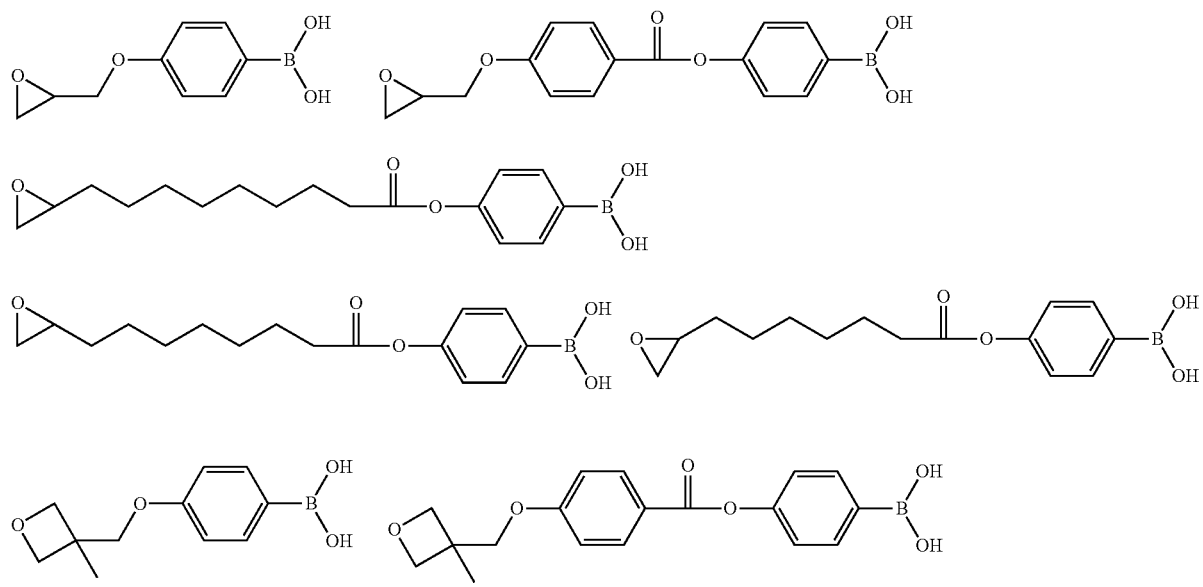

Furthermore, a boronic acid compound represented by the following Formula II may be used.

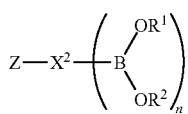

Formula II

In Formula II, Z, $R^1$, and $R^2$ each have the same definition as in Formula I, and the preferred range thereof is also the same.

$X^2$ is an (n+1)-valent linking group obtained by further removing certain (n−1) hydrogen atoms from the divalent linking group represented by X described above. At this time, the preferred range of X is the same as that described above. $X^2$ is preferably an (n+1)-valent linking group obtained by further removing hydrogen atoms from either the linking group A or a divalent linking group constituted with a combination of two or more linking groups A. At this time, the linking group A is preferably an arylene group which may have a substituent or a heteroarylene group which may have a substituent, and more preferably a divalent group formed by removing hydrogen atoms from pyrrole, furan, or thiophene.

n is an integer equal to or greater than 2. n is preferably 2 to 10, and more preferably 3.

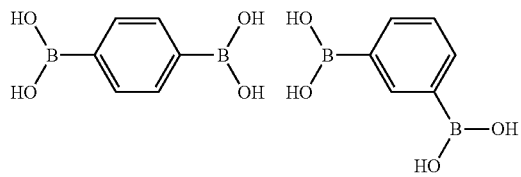

-continued

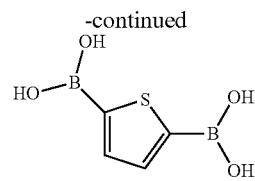

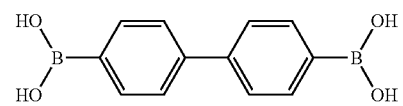

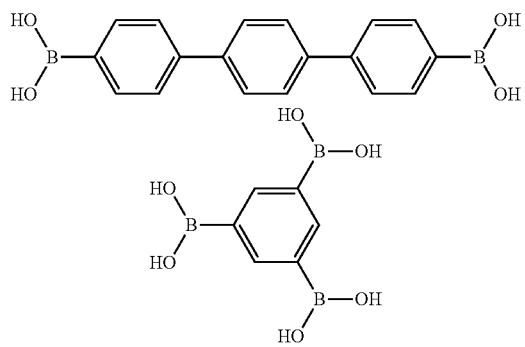

The compound which generates the aforementioned boronic acid compound by being easily decomposed by being brought into contact with an inorganic substance is also preferable. Examples of such a compound include a compound in which the hydrogen of one or two hydroxyl groups bonded to a boron in the boronic acid compound is substituted with a substituent other than a hydrogen atom, and a compound which has, instead of the boronic acid (—B(OH)$_2$) moiety of the boronic acid compound, a moiety having a structure that brings about the same effect as (—B(OH)$_2$) through equilibrium or adsorption when contacting the inorganic substance. Specific examples of the compound which generate the boronic acid compound by being easily decomposed by being brought into contact with an inorganic substance include compounds having a partial structure represented by any of the following formulae. All of the partial structures represented by the following formulae may have a substituent in a substitutable moiety, and in all of the following formulae, the terminal of a single bond extending from boron (B) is bonded to the remaining portion of the compound.

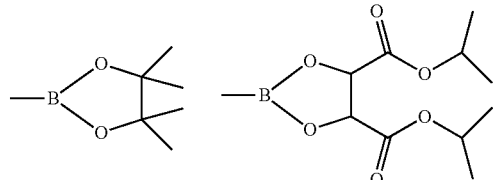
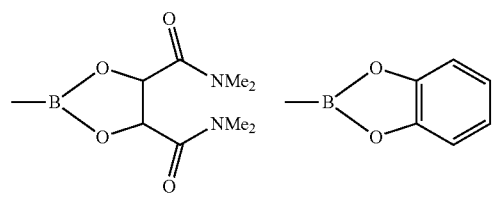
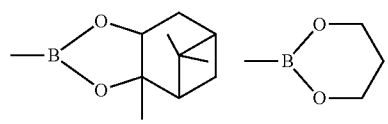
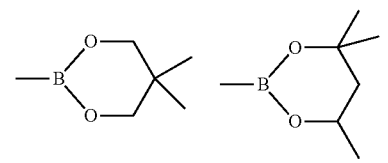
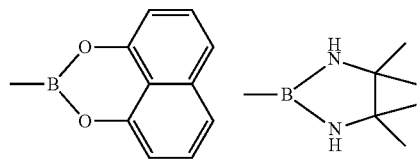
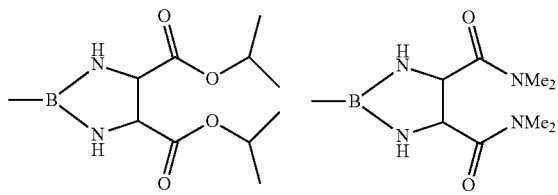
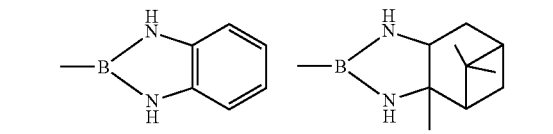
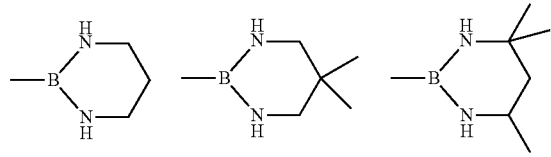

-continued

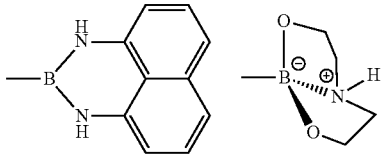
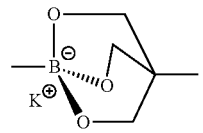

<Method for Manufacturing Boronic Acid Compound>

As the boronic acid compound, a commercially available boronic acid compound may be used as it is. Alternatively, the boronic acid compound may be synthesized by using a boronic acid compound having a substituent as a raw material through a general synthesis reaction such as esterification, amidation, or alkylation. For example, the boronic acid compound can be synthesized from a halide (such as aryl bromide) by using n-butyl lithium and trialkoxyborane (such as trimethoxyborane) or synthesized by performing a Wittig reaction using metallic magnesium.

<Surface-Modified Inorganic Substance>

In the surface-modified inorganic substance, the boronic acid compound modifies the surface of an inorganic substance which is an inorganic nitride or an inorganic oxide. It is preferable that the boronic acid compound modifies the surface by performing a chemical reaction with the inorganic substance. Typically, the boronic acid compound may react with a —NH$_2$ group or a —OH group on the surface of the inorganic substance and form a bond represented by —NH—B— or a bond represented by —O—B—. For example, in a case where the compound represented by Formula I is used as the boronic acid compound, organic chains represented by Z—X— can exist on the surface of the inorganic substance through the aforementioned bond. The organic chains may then form a monolayer preferably in an arrayed state.

The shape of the surface-modified inorganic substance of the present invention is not particularly limited, and may be granular, film-like, or plate-like.

<Method for Manufacturing Surface-Modified Inorganic Substance>

The surface-modified inorganic substance can be easily manufactured by making a contact between an inorganic substance and a boronic acid compound. The contact between the inorganic substance and the boronic acid compound can be established by, for example, stirring a solution containing an inorganic nitride or an inorganic oxide and the boronic acid compound. Particularly, in a case where the inorganic nitride or the inorganic oxide is granular, it is preferable to make the contact by stirring.

A solvent of the aforementioned solution is not particularly limited, but is preferably an organic solvent. Examples of the organic solvent include ethyl acetate, methyl ethyl ketone, dichloromethane, tetrahydrofuran (THF), and the like.

A mixing ratio between the inorganic substance and the boronic acid compound may be determined in consideration of the structure such as the structure and the surface area of the inorganic substance, the aspect ratio of the molecule of the boronic acid compound, and the like.

The stirring conditions are not particularly limited. For example, stirring may be performed at room temperature or may be performed for 1 to 10 seconds at a stirring rotation frequency of about 50 rpm.

<Use of Surface-Modified Inorganic Substance>

The surface of the surface-modified inorganic substance of the present invention is modified using the boronic acid compound as described above, and hence the dispersibility of the substance in an organic solvent, an aqueous solvent, a resin, and the like is adjusted. Therefore, the surface-modified inorganic substance can be applied to various fields as a pigment, a catalyst, an electrode material, a semiconductor material, a heat dissipation material, a thermally conductive material, a lubricant, and the like.

(Heat Dissipation Material and Thermally Conductive Material)

The surface-modified inorganic substance obtained as described above can be used for preparing a heat dissipation material and a thermally conductive material. The heat dissipation material and the thermally conductive material can be prepared in a manner in which the surface-modified inorganic substance is mixed with, dispersed in, or kneaded with a resin binder (a low-molecular weight monomer or a polymer resin) so as to form a film. Specifically, for example, the heat dissipation material and the thermally conductive material can be prepared in a manner in which a film is formed by performing coating by using a composition containing the surface-modified inorganic substance and a resin binder and then subjected to press working.

As the binder resin, those known in the related art may be used. A liquid crystal compound may also be preferably used as the resin binder, because the compound can improve thermal conductivity. For preparing the heat dissipation material or the thermally conductive material, "Highly Thermally Conductive Composite Material" (CMC Publishing CO., LTD., Yoshitaka Takezawa) may be referred to.

(Lubricant)

The surface-modified inorganic substance obtained as above can be used for preparing a lubricant. The lubricant can be prepared in a manner in which the surface-modified inorganic substance is mixed with, dispersed in, or kneaded with grease (a low-molecular weight polymer or a polymer resin) or the like. As the grease, those known in the related art may be used. For preparing the lubricant, it is particularly preferable to use a surface-modified inorganic substance containing boron nitride as an inorganic substance, because boron nitride itself is particularly known to exhibit lubricating properties in high temperatures.

EXAMPLES

Hereinafter, the present invention will be more specifically described based on examples. The materials and reagents, the amounts of substances and a ratio therebetween, the operation, and the like described in the following examples can be appropriately changed within a range that does not depart from the gist of the present invention. Accordingly, the scope of the present invention is not limited to the following examples.

Example 1: Preparation of and Evaluation of Surface-Modified Inorganic Substance Synthesis of Compound A-1

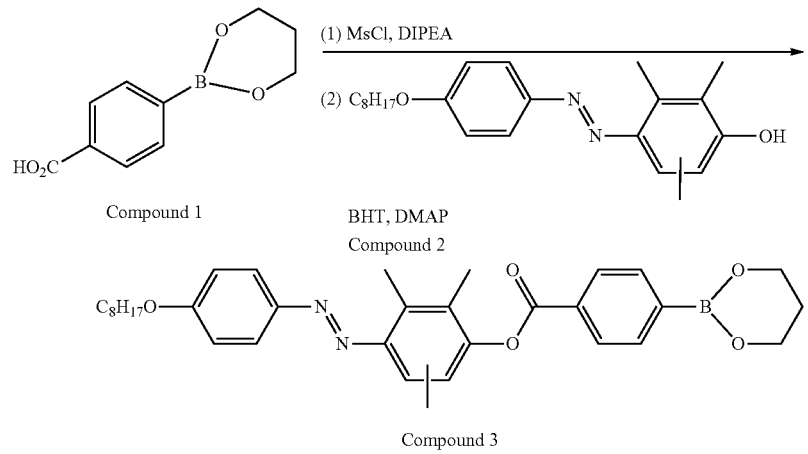

The compound 1 (1.00 g, 4.85 mmol) and 15 mL of acetonitrile were put into a 100 mL three-neck flask and cooled using ice-methanol. Then, 0.4 mL of methyl chloride was added thereto, followed by brief stirring. Thereafter, 0.88 mL of diisopropylethylamine (DIPEA) was added dropwise thereto. After 1 hour, BHT and DMAP were added dropwise in a catalytic amount to a solution obtained by dissolving the compound 2 (1.95 g, 5.10 mmol) in 10 mL of acetonitrile, and then DIPEA was added dropwise thereto. After 2 hours, 55 mL of methanol was added thereto for quenching the reaction. The reaction solution was filtered, the obtained crystal was suspended in and washed with acetonitrile, then filtered, and washed with acetonitrile, thereby obtaining 1.54 g of the compound 3.

The obtained compound 3 (1.54 g) was dissolved in 20 mL of THF and stirred at room temperature, and then 7 mL of 1 N hydrochloric acid was added thereto, followed by stirring. After 2 hours, 150 mL of water was added thereto, followed by filtering, and then the compound was washed with water. The insoluble matter was removed using ethyl acetate, followed by concentration, thereby obtaining 0.98 g of a target compound.

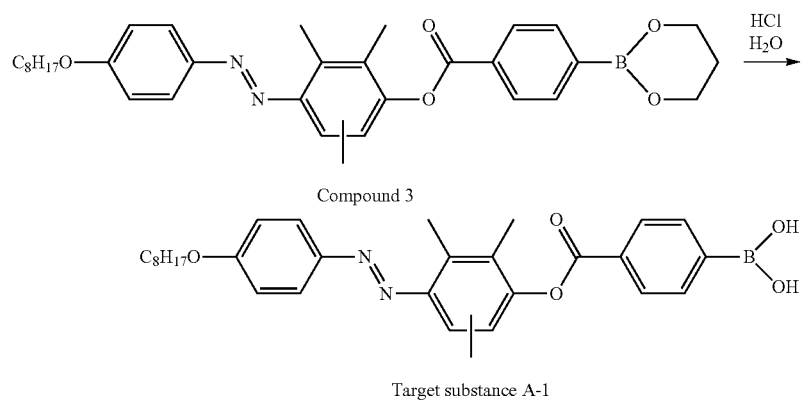
Synthesis of Compound A-2
In the same manner, a compound A-2 was synthesized according to the following synthesis scheme.

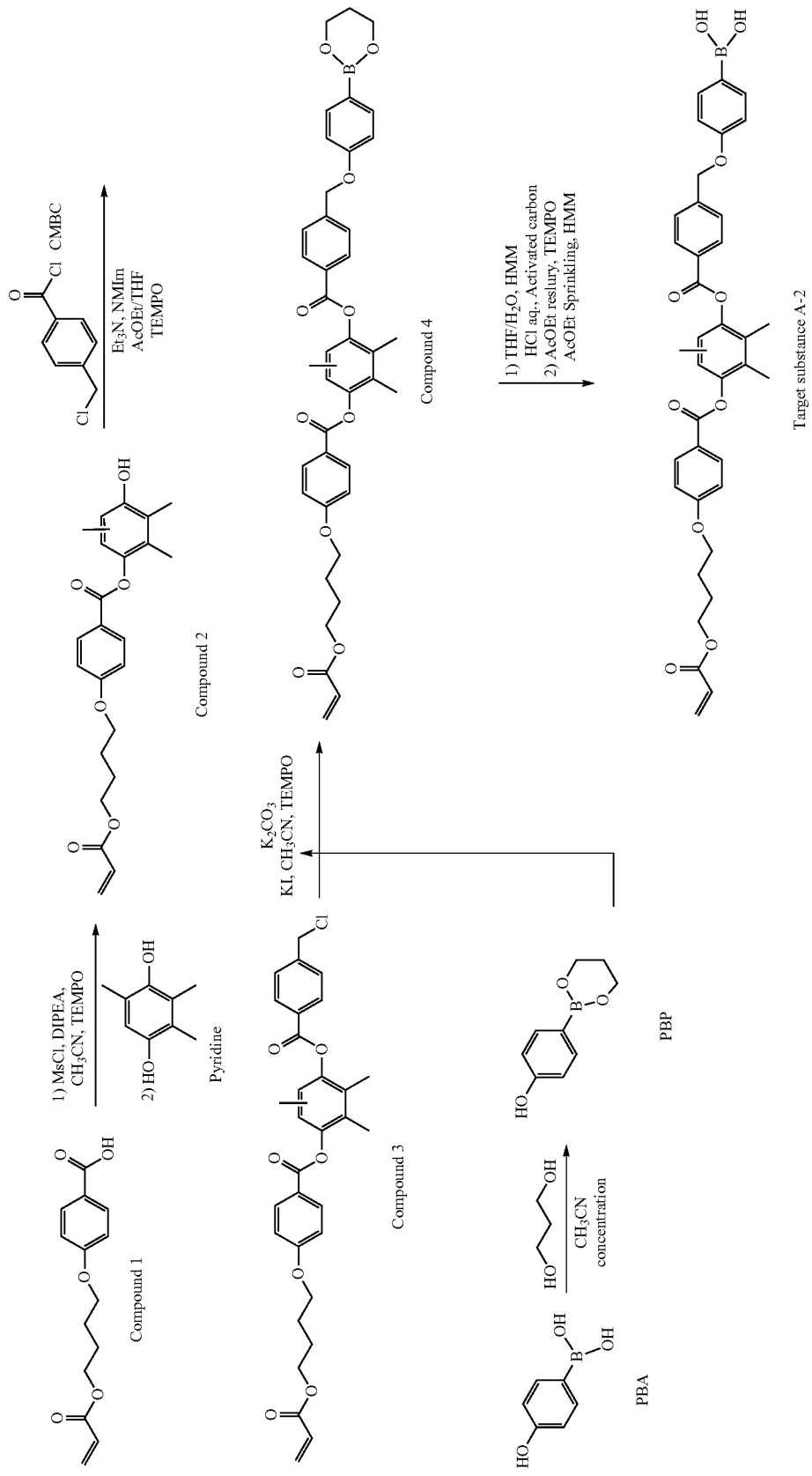

Synthesis of Compound A-3

In the same manner, a compound A-3 was synthesized according to the following scheme.

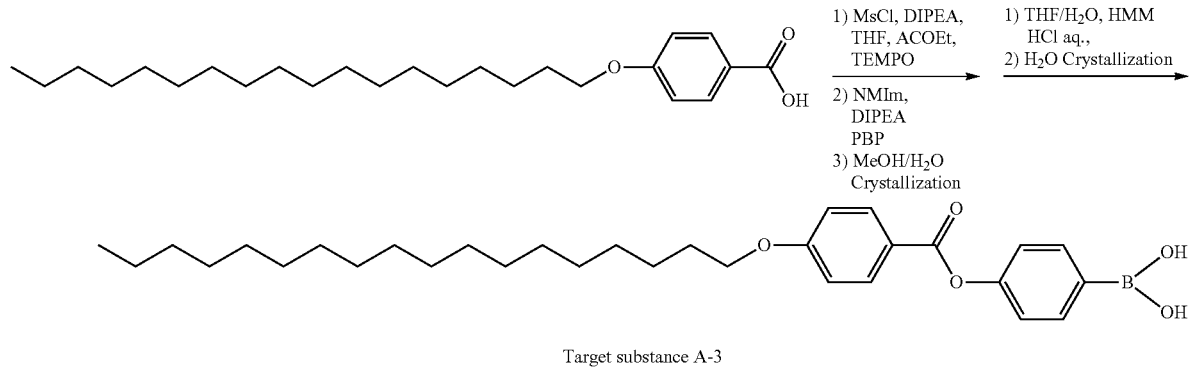

Target substance A-3

The formal names of the abbreviated names of the compounds used in the above reactions or the structures thereof are as below.
TEMPO: 2,2,6,6-tetramethylpiperidine 1-oxyl
DIPEA: N,N-diisopropylethylamine

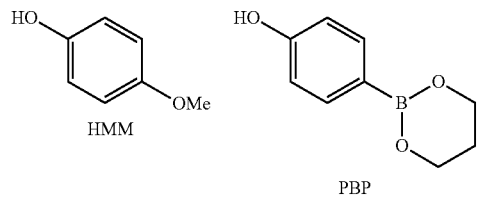

<Establishment of Experiment System>

Alizarin is a compound that is well known to modify the surface of zinc oxide by being bonded to the zinc oxide (JP5479175B). 12 mg of alizarin (manufactured by Wako Pure Chemical Industries, Ltd., catalog No. 015-01151) was dissolved in 300 mL of methyl ethyl ketone. By using a visible absorption spectrum (UV-3100PC manufactured by Shimadzu Corporation) of the solution, the absorbance at a wavelength of 427 nm was measured. Furthermore, 25 mL of the solution was added to separately prepared zinc oxide particles (manufactured by Wako Pure Chemical Industries, Ltd., 264-00365) and gently stirred. After about 5 minutes, the supernatant liquid of the solution was filtered using a 0.45 μm filter (Minisart RC15 manufactured by Sartorius). For the solution obtained after filtration, the absorbance was measured in the same manner as described above. As a result, the absorbance of the solution was found to have increased by 27.6% after the addition of zinc oxide than before the zinc oxide was added. FIG. 1 shows the measured absorption spectra of both solutions. From the obtained result, it was understood that by comparing the absorbance values as described above, it is possible to determine whether or not the surface of an inorganic substance is modified with a boronic acid compound and determine the degree of surface modification from the decrement in absorbance.

(Testing Adsorption onto Nitride and Oxide)

Figure 2:
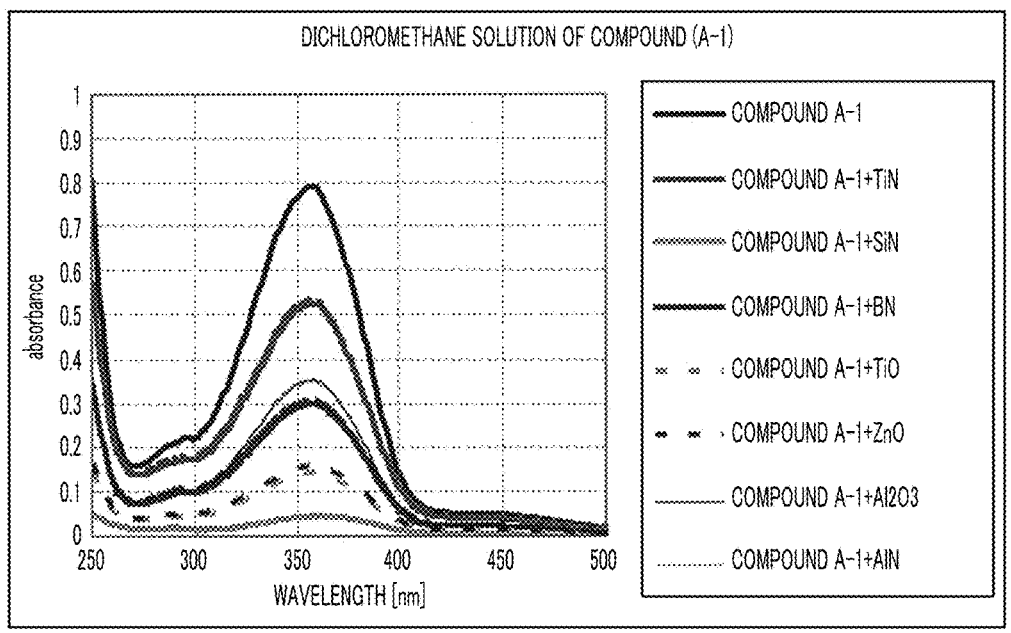
FIG. 2 is a view showing visible absorption spectra of a dichloromethane solution of a compound A-1 and a filtrate of the dichloromethane solution of the compound A-1 obtained after the addition of an inorganic substance.

5.0 mg of the compound (A-1) was dissolved in 300 mL of dichloromethane, 25 ml of the dye solution was added to each of the separately prepared 0.5 g of nitrides and oxides which were boron nitride (manufactured by Wako Pure Chemical Industries, Ltd., 028-02281), silicon nitride (manufactured by Wako Pure Chemical Industries, Ltd., 323-38332), titanium nitride (manufactured by Wako Pure Chemical Industries, Ltd., 200-12451), aluminum nitride (manufactured by Kojundo Chemical Lab. Co., Ltd., ALI 14PB), titanium oxide (manufactured by Wako Pure Chemical Industries, Ltd., 207-13642), zinc oxide (manufactured by Wako Pure Chemical Industries, Ltd., 264-00365), and aluminum oxide (manufactured by Wako Pure Chemical Industries, Ltd., 012-01965), and the solution was gently stirred with a stirring rod. After about 5 minutes, the supernatant liquid of each solution was filtered using a 0.45 μm filter (Minisart RC15 manufactured by Sartorius). For the solution obtained after filtration, the absorbance was measured using an ultraviolet-visible absorption spectrum (UV-3100PC manufactured by Shimadzu Corporation). The results are shown in FIG. 2. Furthermore, the absorbance of the dichloromethane solution of the compound (A-1) at 356 nm, to which a nitride and an oxide were not added, was regarded as being 100%, and the absorbance of the aforementioned filtrate at 356 nm that was measured after the addition of each of the above nitrides and oxides was represented as a %. The results are shown in the following Table 1.

TABLE 1

| A-1 | BN | $Si_3N_4$ | TiN | AlN | TiO | ZnO | $Al_2O_3$ |
|---|---|---|---|---|---|---|---|
| 100% | 38.4% | 5.7% | 66.8% | 44.3% | 18.0% | 20.0% | 44.9% |

As is evident from the results shown in the above table, the absorbance was markedly decreased (by greater than 50%) at 356 nm after the addition of boron nitride, silicon nitride, aluminum nitride, titanium oxide, zinc oxide, and aluminum oxide than before the addition of a nitride or an oxide. The decrement shows that the boronic acid compound was adsorbed onto the surface of a nitride or an oxide and formed a monolayer.

Figure 3:
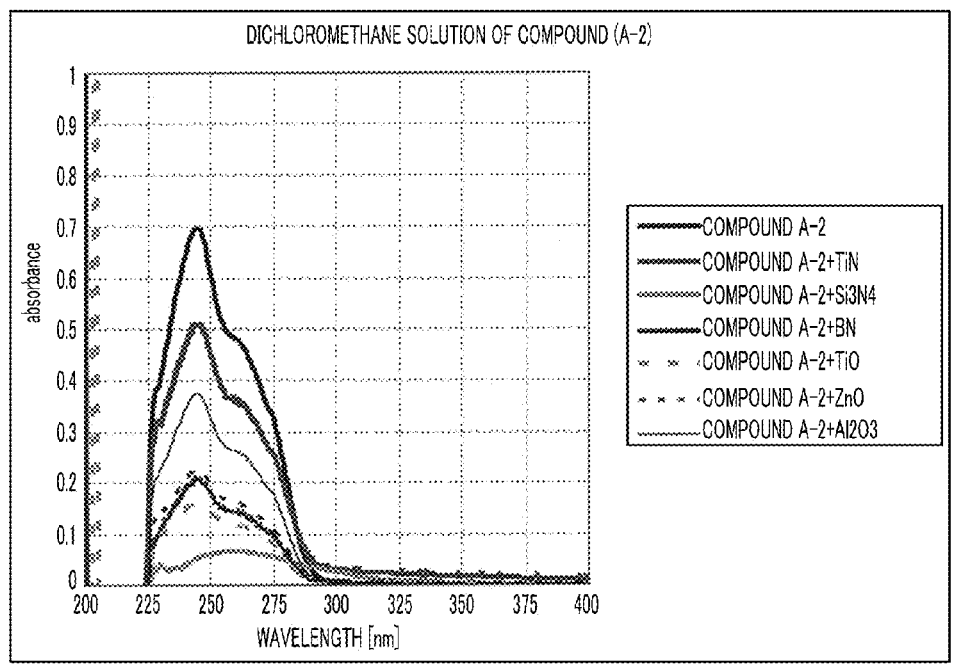
FIG. 3 is a view showing visible absorption spectra of a dichloromethane solution of a compound A-2 and a filtrate of the dichloromethane solution of the compound A-2 obtained after the addition of an inorganic substance.

5.1 mg of the compound (A-2) was dissolved in 500 mL of dichloromethane, 25 mL of the dye solution was added to 0.5 g of a nitride or an oxide in the same manner as described above, and the solution was gently stirred with a stirring rod. Then, after the same operation as described above was performed, the absorbance of the filtered solution was measured using an ultraviolet-visible absorption spectrum. The results are shown in FIG. 3. Furthermore, the absorbance of the dichloromethane solution of the compound (A-2) at 245 nm, to which a nitride and an oxide were not added, was regarded as being 100%, and the absorbance of the aforementioned filtrate at 245 nm that was measured after the addition of each of the above nitrides and oxides was represented as a %. The results are shown in the following Table 2.

TABLE 2

| A-2 | BN | Si₃N₄ | TiN | TiO | ZnO | Al₂O₃ |
|---|---|---|---|---|---|---|
| 100% | 29.5% | 7.9% | 73.1% | 23.4% | 32.1% | 54.0% |

As is evident from the results shown in the above table, the absorbance was markedly decreased (by greater than 50%) at 245 nm after the addition of boron nitride, silicon nitride, titanium oxide, and zinc oxide, than before the addition of nitride or oxide. The decrement shows that the boronic acid compound was adsorbed onto the surface of the particles and formed a monolayer.

5.0 mg of the compound (A-3) was dissolved in 300 mL of dichloromethane, 25 mL of the dye solution was added to 0.5 g of inorganic particles in the same manner as described above, and the solution was gently stirred with a stirring rod. Then, after the same operation as in Example 1 was performed, the absorbance of the filtered solution was measured using an ultraviolet visible absorption spectrum. Furthermore, the absorbance of the dichloromethane solution of the compound (A-3) at 264 nm, to which a nitride and an oxide were not added, was regarded as being 100%, and the absorbance of the aforementioned filtrate at 264 nm that was measured after the addition of each of the above nitrides and oxides was represented as a %. The results are shown in the following Table 3.

TABLE 3

| A-3 | BN | Si₃N₄ | TiN | TiO | ZnO | Al₂O₃ |
|---|---|---|---|---|---|---|
| 100% | 16.9% | 6.5% | 74.1% | 13.8% | 15.4% | 47.7% |

As is evident from the results shown in the above table, the absorbance was markedly decreased (by greater than 50%) at 264 nm after the addition of boron nitride, silicon nitride, titanium oxide, zinc oxide, and aluminum oxide than before the addition of a nitride or an oxide. The decrement shows that the boronic acid compound was adsorbed onto the surface of the particles and formed a monolayer.

Figure 4:
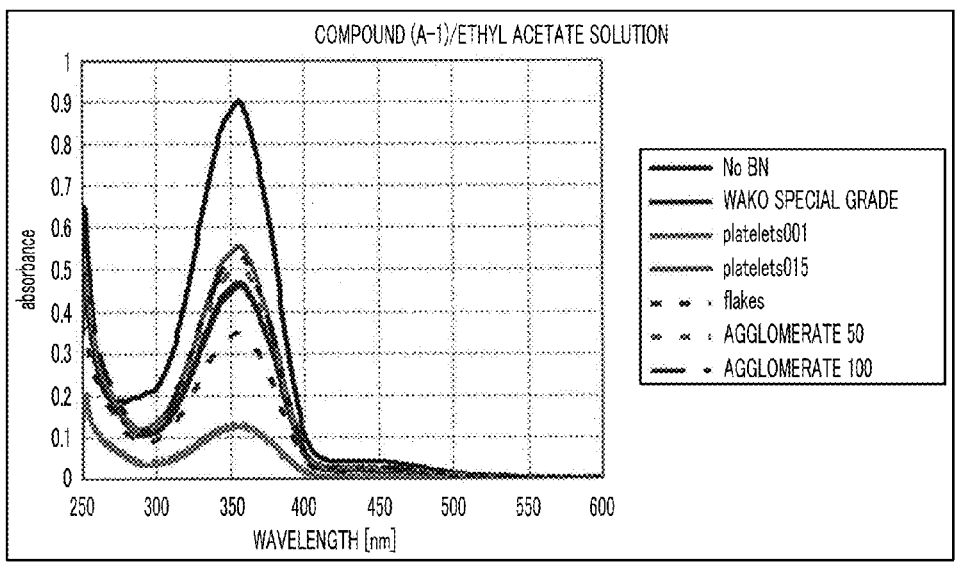
FIG. 4 is a view showing visible absorption spectra of an ethyl acetate solution of the compound A-1 and a filtrate of the ethyl acetate solution of the compound A-1 obtained after the addition of boron nitride of various shapes.

6.74 mg of the compound (A-1) was dissolved in 400 mL of ethyl acetate, and 25 mL of the dye solution was added to 0.5 g of each type of boron nitride ((WAKO special grade) manufactured by Wako Pure Chemical Industries, Ltd., platelets 001, platelets 015, flakes H30/500, AGGLOMERATE 50, and AGGLOMERATE 100 (all manufactured by 3M)), and the solution was gently stirred with a stirring rod. Then, after the same operation as in Example 1 was performed, the absorbance of the filtered solution was measured using an ultraviolet-visible absorption spectrum. The results are shown in FIG. 4. Furthermore, the absorbance of the ethyl acetate solution of the compound (A-1) at 356 nm, to which boron nitride was not added, was regarded as being 100%, and the absorbance of the aforementioned filtrate at 356 nm that was measured after the addition of boron nitride was represented as a %. The results are shown in the following Table 4.

TABLE 4

| A-1 solution | WAKO special grade | platelets 001 | platelets 015 | flakes H30/500 | AG-GLOM-ERATE 50 | AG-GLOM-ERATE 100 |
|---|---|---|---|---|---|---|
| 100.0% | 51.9% | 14.1% | 61.6% | 39.2% | 56.6% | 59.2% |

As is evident from the results shown in the above table, the absorbance was decreased at 356 nm after the addition of various types of boron nitride than before the addition of various types of boron nitride. The decrement shows that the boronic acid compound was adsorbed onto the surface of the particles and formed a monolayer. Furthermore, from the above results, it was understood that the amount of the boronic acid compound adsorbed onto the surface of the particles varies with the shape of boron nitride.

Example 2: Preparation of Thermally Conductive Material (1) 17 parts by mass of a polymerizable liquid crystal compound (manufactured by Merc & Co., Inc., RM-257) represented by the following structure, 80 parts by mass of boron nitride treated with the compound A-2 or 80 parts by mass of untreated boron nitride, and 3 parts by mass of thermal polymerization initiator V-Am 110 (manufactured by Wako Pure Chemical Industries, Ltd., 10-hour half-life decomposition temperature: 110° C.) were dissolved in 100 parts by mass of methyl ethyl ketone, thereby obtaining compositions 1 and 2. A polyvinyl alcohol film was coated with each of the compositions 1 and 2 by using an applicator such that the thickness became 100μ. The film coated with the composition was dried for 1 hour at room temperature and then for 120 minutes at 120° C. such that the composition was semi-cured, the solvent was distilled away, and the polyvinyl alcohol film was exfoliated, thereby obtaining a prepreg sheet. The obtained prepreg sheet was interposed between aluminum foils having a thickness of 40 μm, subjected to vacuum press molding (press temperature; 130° C., degree of vacuum; 1 kPa, press pressure; 6 MPa, treatment time; 20 minutes), and then the press temperature was increased up to 180° C. for 40 minutes. After the press molding, the aluminum foils were exfoliated, thereby obtaining a sheet-like cured substance having a thickness of 320 μm.

Polymerizable Liquid Crystal Compound

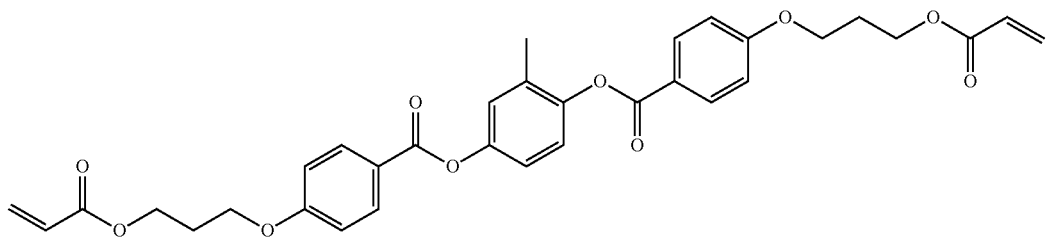 [SMILES: C=CC(=O)OCCCOc1ccc(C(=O)Oc2ccc(OC(=O)c3ccc(OCCCOC(=O)C=C)cc3)c(C)c2)cc1]

By using a xenon flash analyzer nanoflash LFA447 manufactured by NETZCII, the thermal conductivity of the obtained cured substance was measured. As a result, it was found that, while the cured substance of the composition solution 1 using treated boron nitride had a thermal conductivity of 7.2 W/m-K, the cured substance of the composition solution 2 using untreated boron nitride had a thermal conductivity of 5.6 W/m·K, showing poorer thermal conductivity.

(2) A sheet-like cured substance having a thickness of 300 μm was obtained in the same manner as in Example 1, except that the polymerizable liquid crystal compound used in the above section (1) was replaced with the following compound described in JP2696480B.

Polymerizable Liquid Crystal Compound

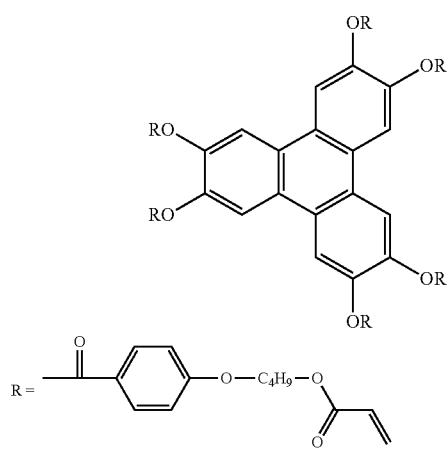

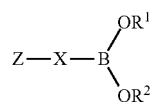

By using a xenon flash analyzer nanoflash LFA447 manufactured by NETZCII, the thermal conductivity of the obtained cured substance was measured. As a result, it was found that, while the cured substance of the composition solution 1 using treated boron nitride had a thermal conductivity of 8.1 W/m-K, the cured substance of the composition solution 2 using untreated boron nitride had a thermal conductivity of 5.9 W/m·K, showing poorer thermal conductivity.

What is claimed is:

1. A surface-modified inorganic substance, in which a boronic acid compound is bonded to at least a portion of a surface of an inorganic nitride, wherein the inorganic nitride contains boron or silicon, or the inorganic nitride is aluminum nitride.

2. The surface-modified inorganic substance according to claim 1,
    wherein the boronic acid compound is represented by the following Formula I, Formula I

Z—X—B(OR$^1$)(OR$^2$)

in the formula, Z represents a polymerizable group, a hydrogen atom, a halogen atom, a quaternary ammonium group or a salt thereof, or a quaternary pyridinium group which may have a substituent or a salt thereof, X represents a divalent linking group containing at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, and $R^1$ and $R^2$ may be linked through an alkylene linking group, an aryl linking group, or a linking group as a combination of an alkylene linking group and an aryl linking group.

3. The surface-modified inorganic substance according to claim 1,
    wherein the boronic acid compound is represented by the following Formula II,

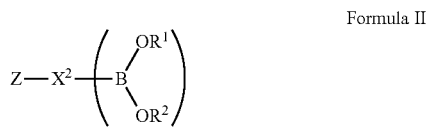

Formula II in the formula, Z represents a polymerizable group, a hydrogen atom, a halogen atom, a quaternary ammonium group or a salt thereof, or a quaternary pyridinium group which may have a substituent or a salt thereof, $X^2$ represents an (n+1)-valent linking group containing at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, $R^1$ and $R^2$ may be linked through an alkylene linking group, an aryl linking group, or a linking group as a combination of an alkylene linking group and an aryl linking group, and n represents an integer equal to or greater than 2.

4. The surface-modified inorganic substance according to claim 2,
    wherein in Formula I, Z represents a (meth)acrylate group, an oxiranyl group, or a hydrogen atom.

5. The surface-modified inorganic substance according to claim 3,
    wherein in Formula II, Z represents a (meth)acrylate group, an oxiranyl group, or a hydrogen atom.

6. The surface-modified inorganic substance according to claim 1,
    wherein the modification of the surface is modification accomplished when the boronic acid compound forms a covalent bond with the surface of the inorganic nitride.

7. A heat dissipation material, thermally conductive material, or lubricant comprising:
    the surface-modified inorganic substance according to claim 1.

8. A method for manufacturing the surface-modified inorganic substance according to claim 1, comprising:
    making a contact between the inorganic nitride and the boronic acid compound.

9. The method for manufacturing the surface-modified inorganic substance according to claim 8,
    wherein the contact is established by stirring a solution containing the inorganic nitride and the boronic acid compound.

10. The method for manufacturing the surface-modified inorganic substance according to claim 8,
wherein a solvent of the solution is ethyl acetate, methyl ethyl ketone, or dichloromethane.

11. The surface-modified inorganic substance according to claim 1, wherein the inorganic nitride contains boron or silicon.

\* \* \* \* \*